United States Patent
Xiong et al.

(10) Patent No.: US 10,059,393 B2
(45) Date of Patent: Aug. 28, 2018

(54) ANTI-FALLING ROBOTS, ANTI-FALLING METHOD, AND ANTI-FALLING DEVICE OF ROBOTS DURING POWER OUTAGE

(71) Applicant: UBTECH Robotics Corp., Shenzhen (CN)

(72) Inventors: Youjun Xiong, Shenzhen (CN); Xiongxing Zha, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/633,647

(22) Filed: Jun. 26, 2017

(65) Prior Publication Data

US 2018/0186415 A1   Jul. 5, 2018

(30) Foreign Application Priority Data

Dec. 31, 2016   (CN) .......................... 2016 1 1266119

(51) Int. Cl.
   *B25J 5/00*      (2006.01)
   *B62D 57/032*   (2006.01)
   *G06F 1/32*     (2006.01)

(52) U.S. Cl.
   CPC .......... *B62D 57/032* (2013.01); *G06F 1/3212* (2013.01)

(58) Field of Classification Search
   CPC ............................ B25J 9/1674; B25J 9/1664
   See application file for complete search history.

(56) References Cited

U.S. PATENT DOCUMENTS

| 9,429,948 | B2 * | 8/2016 | Gouaillier | B62D 57/032 |
| 2006/0033462 | A1 * | 2/2006 | Moridaira | B25J 9/1674 |
| | | | | 318/568.12 |
| 2016/0347385 | A1 * | 12/2016 | Lung | B25J 9/1607 |
| 2017/0327165 | A1 * | 11/2017 | Yamaguchi | B62D 57/032 |

* cited by examiner

*Primary Examiner* — Karen Masih (57) ABSTRACT

An anti-falling method during power outage includes: transmitting first controlling signals to a first leg mechanism and a second leg mechanism to control a first leg and a second leg of the robot to be perpendicular to ground upon determining a power outage condition; transmitting second controlling signals to the first leg mechanism and/or the second leg mechanism to control the first leg and/or the second leg of the robot; controlling the first leg and/or the second leg to move the center of gravity of the robot close to the ground; transmitting third controlling signals to the first leg mechanism and the second leg mechanism to stop movements of the first leg mechanism and the second leg mechanism upon determining a stop condition.

18 Claims, 4 Drawing Sheets

ANTI-FALLING ROBOTS, ANTI-FALLING METHOD, AND ANTI-FALLING DEVICE OF ROBOTS DURING POWER OUTAGE

CROSS REFERENCE TO RELATED APPLICATIONS

This application claims priority to Chinese Patent Application No. 201611266119.9, filed Dec. 31, 2016, which is hereby incorporated by reference herein in its entirety.

BACKGROUND

1. Technical Field

The present disclosure generally relates to a field of robots, and particularly to an anti-falling robots, an anti-falling method, and an anti-falling device of robots during power outage.

2. Description of Related Art

With developments of service-oriented robots, robots are becoming more and more intelligent. The robots may be controlled by clients to do sport, sing songs, and talk with human. However, common robots, particularly to biped robots, may fall during performing an action when power outage suddenly happens. Since the power outage of the robots, internal and external components of the robots may malfunction or even be damaged, which is a problem to be solved.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Embodiment 1

Figure 2A:
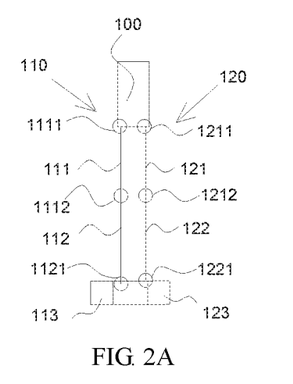
FIG. 2A is a first schematic diagram of a movement using an anti-falling method of robots during power outage.
Figure 2B:
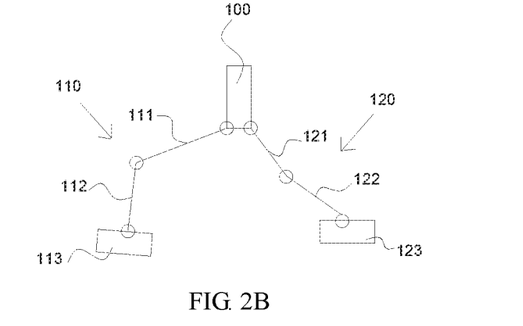
FIG. 2B is a second schematic diagram of a movement using an anti-falling method of robots during power outage.
Figure 2C:
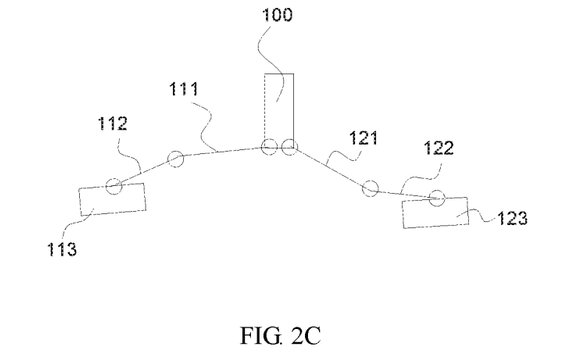
FIG. 2C is a third schematic diagram of a movement using an anti-falling method of robots during power outage.

With reference to FIGS. 2A to 2C, a robot comprises a waist 100, a first leg 110, a first foot 113, a second leg 120, a second foot 123, a first leg mechanism, and a second leg mechanism. The first leg 110 includes a first thigh 111, a first calf 112. The second leg 120 includes a second thigh 121 and a second calf 122. The first leg mechanism of the robot comprises a first hip joint 1111 connecting the waist 100 and the first thigh 111, a first knee joint 1112 connecting the first thigh 111 and the first calf 112, and a first ankle joint 1121 connecting the first calf 112 and the first foot 113. The second leg mechanism comprises a second hip joint 1211 connecting the waist 100 and the second thigh 121, a second knee joint 1212 connecting the second thigh 121 and the second calf 122, and a second ankle joint 1221 connecting the second calf 122 and the second foot 123. The first foot 113 and/or the second foot 123 may be controlled by the first leg mechanism and the second leg mechanism. The first foot 113 and the second foot 123 may also be adjusted by the first ankle joint 1121 and the second ankle joint 1221. The robot may further comprise a body or arms. To maintain a balance of the robots not to fall, a center of gravity of the robot needs to be adjusted according to a posture of the robot. The center of the gravity of the robot may be adjusted or moved by adjusting the arms, the waist, and the legs of the robot. For example, the body of the robot may be forward or backward according to movement of the waist of the robot.

Figure 1:
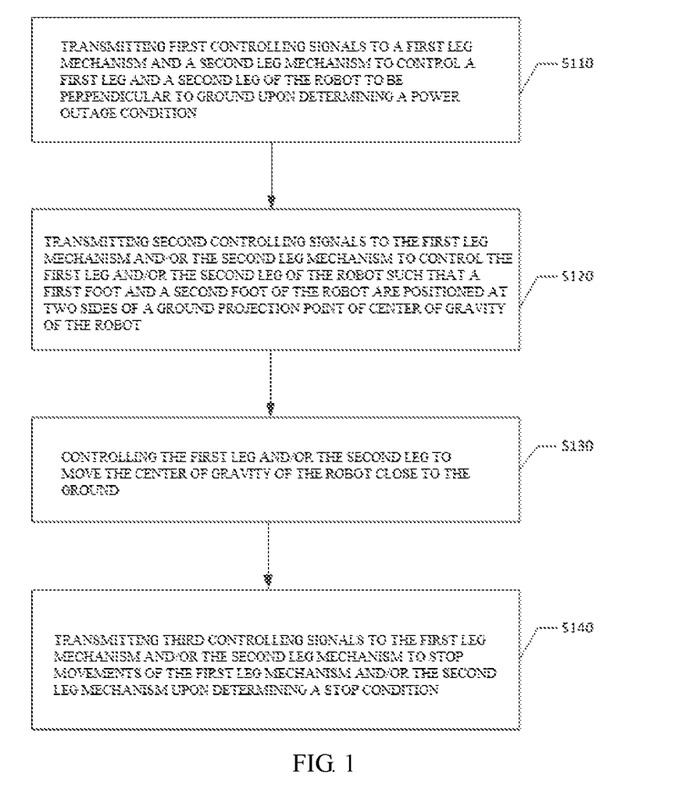
FIG. 1 is a flowchart of anti-falling method of robots during power outage in accordance with a first embodiment of the present disclosure.

With reference to FIG. 1, an anti-falling method of robots during power outage comprises the following steps:

In step S110, as shown in FIG. 2A, transmitting first controlling signals to a first leg mechanism and a second leg mechanism to control a first leg 110 and a second leg 120 of the robot to be perpendicular to ground upon determining a power outage condition;

The robot is in the power outage condition when an amount of available supply power of the robot is lower than a predetermined value, or shutdown control signals have been received. When the amount of available supply power of the robot is lower than the predetermined value, or the shutdown control signals have been received, the robot may be in various postures. In order to reduce executing time of the anti-falling method, at first, the first leg 110 and the second leg 120 of the robot need to be perpendicular to the ground, and then the anti-falling method is continuously executed.

In step S120, transmitting second controlling signals to the first leg mechanism and/or the second leg mechanism to control the first leg 110 and/or the second leg 12 of the robot such that a first foot 113 and a second foot 123 of the robot are positioned at two sides of a ground projection point of center of gravity of the robot;

As shown in FIG. 2B, the first leg 110 and the second leg 120 are respectively positioned along one of two directions. Therefore, the robot may have a large area of support region to prevent the fall.

Further, the step S120 may be implemented by only one leg or two legs of the robot, and may be implemented by moving the leg of the robot with a large scale movement, or by moving the leg of the robot with multiple small scale movements.

In the embodiment, the step S120 is implemented by only one leg of the robot. The step S120, further comprises the following steps:

In step S1201, adjusting the center of gravity of the robot to move the ground projection point of the center of the gravity to be positioned at the first leg 113 of the robot;

The center of gravity of the robot may be adjusted or moved by adjusting the arms, the waist, the legs of the robot. For example, the body of the robot may be forward or backward according to movement of the waist of the robot. The robot may be supported by the first foot 113, and then the robot may lift the second foot 123.

In step S1202, controlling the second leg mechanism to drive the second leg 123 of the robot to move along a first direction;

In other words, the robot spans the second leg 120 in the first direction.

When the second hip joint 1211 and the second knee joint 1212 of the robot are mounted on two sides of the second thigh 121, the second ankle joint 1221 is mounted on the second calf 122, the step S1202 further comprises: rotating the second hip joint 1211 and the second knee joint along 1212 a counterclockwise direction, and rotating the second ankle joint 1221 along a clockwise direction.

In the embodiment of the present disclosure, as shown in FIGS. 2A to 2C, the counterclockwise direction and the clockwise direction are defined when the first leg 110 is at left side of the figures and the second leg 120 is at right side of the figures. In other embodiment, the counterclockwise direction and the clockwise direction may be different.

In step S1203, controlling the first leg mechanism and/or the second leg mechanism to drive the second foot 123 of the robot to contact the ground;

The second foot 123 may be prepared to be a supporting point of the robot.

In step S1204, adjusting the center of gravity of the robot to move the ground projection point of the center of the gravity to be positioned at a middle of the first leg 113 and the second leg 123 of the robot.

When the ground projection point of the center of the gravity of the robot is positioned at the middle of the first leg 113 and the second leg 123, the first foot 113 with a certain angle between the formation of the second foot 123. The first foot 113, the second foot 123, and the center of the gravity of the robot are formed a stable triangle to support the robot not to fall.

In other embodiment, the step S120 is implemented by two legs of the robot. The step S120, further comprises the following steps:

In step S1201', adjusting the center of gravity of the robot to move the ground projection point of the center of the gravity to be positioned at the first leg 113 of the robot;

The robot may be supported by the first foot 113, and then the robot may lift the second foot 123.

The center of gravity of the robot may be adjusted or moved by adjusting the arms, the waist, the legs of the robot. For example, the body of the robot may be forward or backward according to movement of the waist of the robot.

In step S1202', controlling the second leg mechanism to drive the second leg 123 of the robot to move along a second direction;

In other words, the robot spans the second leg 120 in the second direction.

In step S1203', controlling the first leg mechanism and/or the second leg mechanism to drive the second foot 123 of the robot to contact the ground;

The second foot 123 may be prepared to be a supporting point of the robot.

In step S1204', adjusting the center of gravity of the robot to move the ground projection point of the center of the gravity to be positioned at the second leg 123 of the robot;

In the mean time, the first foot 113 and the second foot 123 are closed. Therefore, a distance between the first foot 113 and the second foot 123 need to be increased to stabilize the robot. The robot may be supported by the second foot 123, and then the robot may lift the first foot 113.

In step S1205', controlling the first leg mechanism to drive the first leg 113 of the robot to move along a third direction;

The third direction is opposite to the second direction. In other words, the robot spans the first leg 110 in the third direction.

In step S1206', controlling the first leg mechanism and/or the second leg mechanism to drive the first foot 113 of the robot to contact the ground. Therefore, distance between the first foot 113 and the second foot 123 is increased to stabilize the robot.

In the mean time, the first foot 113, the second foot 123, and the center of the gravity of the robot are formed the stable triangle to support the robot not to fall.

In step S130, controlling the first leg 110 and/or the second leg 120 to move the center of gravity of the robot close to the ground;

In other words, the center of gravity of the robot is stayed down, as shown in FIG. 2a, stabilization of the robot may be increased to prevent the robot from the fall.

When the first hip joint 1111 and the first knee joint 1112 are mounted at two sides of the first thigh 11*l*, the first ankle joint 1121 is mounted on the 112, the second hip joint 1211 and the second knee joint 1212 are mounted at two sides of the second thigh 121, and the second ankle joint 1221 is mounted on the second calf 122, the robot drives the first leg 110 and/or the second leg 120 to close to the ground.

The robot drives the first leg 110 and/or the second leg 120 to close to the ground by rotating the first hip joint and the first knee joint along the counterclockwise direction, by rotating the first ankle joint along the clockwise direction, by rotating the second hip joint and the second knee joint along the counterclockwise direction, and by rotating the second ankle joint along the clockwise direction.

In step S140, transmitting third controlling signals to the first leg mechanism and the second leg mechanism to stop movements of the first leg mechanism and the second leg mechanism upon determining a stop condition.

When the center of gravity of the robot is lower than a predetermined height or the center of gravity of the robot falls by predetermined time period, such as 3 seconds, the stop condition is completely satisfied. When any joint of the robot contacts the ground or a support table, the stop condition is also completely satisfied.

It should be noted that the above analysis gives an example of a fixed position of the joint for ease of understanding and saving space. If the fixed position of the joint is changed on this basis, it should be considered that the person skilled in the art is motivated and easily changed the direction of rotation of the joints to achieve the legs, foot the same action.

In the embodiment of the present disclosure, when the power outage condition is satisfied, the first leg 110 and/or the second leg 120 is controlled to drive the first foot 113 and the second foot 123 to be positioned at two sides of the ground projection point of the center of gravity of the robot. Therefore, the robot may have a large area of support region to prevent the fall.

The first direction and the second direction may be a front direction and a back direction of the robot, or may be a right direction and a left direction of the robot. The hip joint, the knee joint, and the ankle joint are respectively configured to have pitching degree of freedom or deflection degree of freedom. The pitching degree of freedom or the deflection degree of freedom are controlled by steering gears to drive the joints. The steering gear is one of the earliest applications in the aircraft model and the movement of the power plant. Control signals of the steering gear are pulse width modulation signals, so it is convenient to be connected to a digital system. Any digital device which may generate standard digital signals may drive the steering gear, such as a PLC and a single chip microcomputer. This type of motor is compact, may easily to install, may have large output torque, may have good stability, and may be easily controlled, so the steering gear has been widely used in the field of robots.

In other embodiment, the leg of the robot includes the hip joint, the knee joint, and the ankle joint, and the leg of the robot further includes a joint. The flow of the anti-falling method of the robot during power outage is mostly same as the above mentioned anti-falling method. The different between the anti-falling method of the other embodiment and the above mentioned anti-falling method is that the direction and the magnitude of the rotation of the joint are changed.

Embodiment 2

Figure 3:
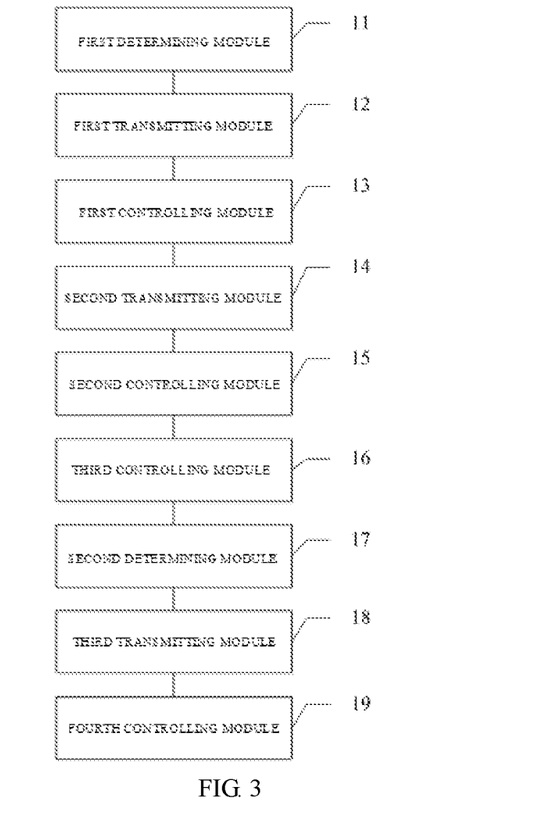
FIG. 3 is a flowchart of anti-falling method of robots during power outage in accordance with a second embodiment of the present disclosure.

With reference to FIG. 3, an anti-falling device of robots during power outage includes a first determining module 11, a first transmitting module 12, a first controlling module 13, a second transmitting module 14, a second controlling module 15, a third controlling module 16, a second determining module 17, a third transmitting module 18, and a fourth controlling module 19.

The first determining module 11 is configured to determine a power outage condition.

The robot is in the power outage condition when the first determining module 11 determines that an amount of available supply power of the robot is lower than a predetermined value, or shutdown control signals have been received.

The first transmitting module 12 is configured to transmit first controlling signals to a first leg mechanism and a second leg mechanism upon determining a power outage condition.

The first controlling module 13 is configured to control a first leg 110 and a second leg 120 of the robot to be perpendicular to ground.

The second transmitting module 14 is configured to transmit second controlling signals to the first leg mechanism and/or the second leg mechanism.

The second controlling module 15 is configured to control the first leg 110 and/or the second leg 12 of the robot such that a first foot 113 and a second foot 123 of the robot are positioned at two sides of a ground projection point of center of gravity of the robot.

The third controlling module 16 is configured to control the first leg 110 and/or the second leg 120 to move the center of gravity of the robot close to the ground.

The second determining module 17 is configured to determine a stop condition.

The third transmitting module 18 is configured to transmit third controlling signals to the first leg mechanism and the second leg mechanism upon determining a stop condition The fourth controlling module 19 is configured to stop movements of the first leg mechanism and the second leg mechanism.

The anti-falling device in the present embodiment and the anti-falling method in the foregoing embodiment are based on two aspects under the same inventive concept, and the process of the method has been described in detail. Therefore, those skilled in the art that the structure and the implementation process of the system in the present embodiment can be clearly understood from the foregoing description and will not be described here for the sake of simplicity of the specification.

For the sake of convenience of description, the above devices are described in terms of functions described in various modules. Of course, the functionality of each module may be implemented in the same or more software and/or hardware when implementing the present invention.

As will be understood from the description of the above embodiments, it will be apparent to those skilled in the art that the present invention can be realized by means of software plus a common hardware platform. Based on this understanding, the technical solution of the present invention, either essentially or in part, contributes to the prior art, and may be embodied in the form of a software product. The software product can be stored in a storage medium such as ROM/RAM, disk, optical disk, and the like including a number of instructions for enabling a computer device (which may be a personal computer, a server, or a network device, etc.) to perform the methods described in certain portions of the various embodiments or embodiments of the present invention.

The described embodiment of the apparatus is merely illustrative, wherein the modules or units described as separate components may or may not be physically separate. The components indicated as modules or units may or may not be physical modules, either in one place or on multiple network modules. The part or all of the elements may be selected according to the actual needs to achieve the object of the present embodiment. One of ordinary skill in the art will understand and practice without paying creative work.

As shown in an embodiment 3, the present disclosure may be used in a number of general purpose or special computing system environments or configurations, such as personal computers, server computers, handheld devices or portable devices, flatbed devices, multiprocessor systems, microprocessor-based systems, set-top boxes, programmable consumer electronics devices, network PCs, small computers, large computers, including any of the above systems, or the distributed computing environment of the device and so on.

Embodiment 3

Figure 4:
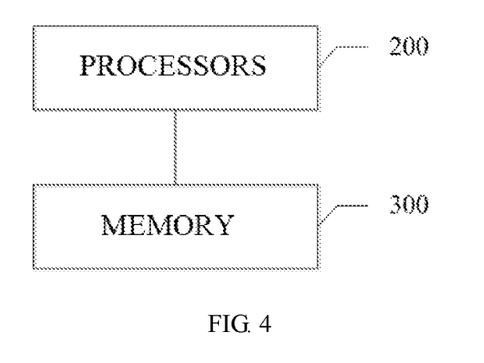
FIG. 4 is a flowchart of anti-falling method of robots during power outage in accordance with a third embodiment of the present disclosure.

With reference to FIG. 4, an anti-falling device of robots during power outage, includes one or more processors 200; and
a memory 300; and
one or more programs, wherein the one or more programs are stored in the memory and configured to be executed by the one or more processors, the one or more programs including:
instructions for transmitting first controlling signals to a first leg mechanism and a second leg mechanism to control a first leg and a second leg of the robot to be perpendicular to ground upon determining a power outage condition;
instructions for transmitting second controlling signals to the first leg mechanism and/or the second leg mechanism to control the first leg and/or the second leg of the robot such that a first foot and a second foot of the robot are positioned at two sides of a ground projection point of center of gravity of the robot;
instructions for controlling the first leg and/or the second leg to move the center of gravity of the robot close to the ground;
instructions for transmitting third controlling signals to the first leg mechanism and the second leg mechanism to stop movements of the first leg mechanism and the second leg mechanism upon determining a stop condition.

The anti-falling device in the present embodiment and the anti-falling method in the foregoing embodiment are based on two aspects under the same inventive concept, and the process of the method has been described in detail. Therefore, those skilled in the art that the structure and the implementation process of the system in the present embodiment can be clearly understood from the foregoing description and will not be described here for the sake of simplicity of the specification.

In the embodiment of the present disclosure, when the power outage condition is satisfied, the first leg 110 and/or the second leg 120 is controlled to drive the first foot 113 and the second foot 123 to be positioned at two sides of the ground projection point of the center of gravity of the robot. Therefore, the robot may have a large area of support region to prevent the fall.

The anti-falling device may be used in a robot, and particularly to an anti-falling robots. In other words, an anti-falling robot should also fall within the scope of the present disclosure.

The "first", "second" and "third" aspects of the present disclosure are only used to distinguish different parts and do not have a distinguishing sequence effect. The term "ground" as used herein may be a plane in which the ground, the table top, the table, etc. that are in contact with the foot of the robot.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An anti-falling method of robots during power outage, comprising:
    transmitting first controlling signals to a first leg mechanism and a second leg mechanism to control a first leg and a second leg of the robot to be perpendicular to ground upon determining a power outage condition;
    transmitting second controlling signals to the first leg mechanism and/or the second leg mechanism to control the first leg and/or the second leg of the robot to move from the perpendicular to ground position, such that a first foot and a second foot of the robot are positioned at two sides of a ground projection point of center of gravity of the robot;
    controlling the first leg and/or the second leg to move the center of gravity of the robot close to the ground;
    transmitting third controlling signals to the first leg mechanism and/or the second leg mechanism to stop movements of the first leg mechanism and/or the second leg mechanism upon determining a stop condition.

2. The anti-falling method of the robots during power outage as claimed in claim 1, wherein: the robot is in the power outage condition in response to an amount of available supply power of the robot being lower than a predetermined value, or shutdown control signals have been received.

3. The anti-falling method of the robots during power outage as claimed in claim 1, wherein the step of transmitting second controlling signals to the first leg mechanism and/or the second leg mechanism to control the first leg and/or the second leg of the robot such that a first foot and a second foot of the robot are positioned at two sides of a ground projection point of center of gravity of the robot further comprises:
    adjusting the center of gravity of the robot to move the ground projection point of the center of the gravity to be positioned at the first leg of the robot;
    controlling the second leg mechanism to drive the second leg of the robot to move along a first direction;
    controlling the first leg mechanism and/or the second leg mechanism to drive the second foot of the robot to contact the ground;
    adjusting the center of gravity of the robot to move the ground projection point of the center of the gravity to be positioned at a middle of the first leg and the second leg of the robot.

4. The anti-falling method of the robots during power outage as claimed in claim 3, wherein the second leg mechanism comprises a second hip joint connecting a waist and a second thigh of the robot, a second knee joint connecting the second thigh and a second calf of the robot, and a second ankle joint connecting the second calf and the second foot of the robot; wherein the second hip joint and the second knee joint are respectively mounted on two side of the second thigh, and the second ankle joint is mounted on the second calf;
    wherein the step of controlling the second leg mechanism to drive the second leg of the robot to move along the first direction further comprises:
    rotating the second hip joint and the second knee joint along a counterclockwise direction and rotating the second ankle joint along a clockwise direction.

5. The anti-falling method of the robots during power outage as claimed in claim 1, wherein the first leg mechanism comprises a first hip joint connecting a waist and a first thigh of the robot, a first knee joint connecting the first thigh and a first calf of the robot, a first ankle joint connecting the first calf and the first foot of the robot; wherein the first hip joint and the first knee joint are respectively mounted on two side of the first thigh, and the first ankle joint is mounted on the first calf;
    wherein the second leg mechanism comprises a second hip joint connecting a waist and a second thigh of the robot, a second knee joint connecting the second thigh and a second calf of the robot, a second ankle joint connecting the second calf and the second foot of the robot; wherein the second hip joint and the second knee joint are respectively mounted on two side of the second thigh, and the second ankle joint is mounted on the second calf;
    wherein the step of controlling the first leg and/or the second leg to move the center of gravity of the robot close to the ground is implemented by:
    rotating the first hip joint and the first knee joint along a counterclockwise direction;
    rotating the first ankle joint along a clockwise direction;
    rotating the second hip joint and the second knee joint along the counterclockwise direction; and
    rotating the second ankle joint along the clockwise direction.

6. The anti-falling method of the robots during power outage as claimed in claim 1, wherein the step of transmitting second controlling signals to the first leg mechanism and/or the second leg mechanism to control the first leg and/or the second leg of the robot such that a first foot and a second foot of the robot are positioned at two sides of a ground projection point of center of gravity of the robot further comprises:

adjusting the center of gravity of the robot to move the ground projection point of the center of the gravity to be positioned at the first leg of the robot;

controlling the second leg mechanism to drive the second leg of the robot to move along a second direction;

controlling the first leg mechanism and/or the second leg mechanism to drive the second foot of the robot to contact the ground;

adjusting the center of gravity of the robot to move the ground projection point of the center of the gravity to be positioned at the second leg of the robot;

controlling the first leg mechanism to drive the first leg of the robot to move along a third direction; wherein the third direction is opposite to the second direction;

controlling the first leg mechanism and/or the second leg mechanism to drive the first foot of the robot to contact the ground.

7. An anti-falling device of robots during power outage, comprising:

one or more processors; and a memory; and one or more programs, wherein the one or more programs are stored in the memory and configured to be executed by the one or more processors, the one or more programs comprises:

instructions for transmitting first controlling signals to a first leg mechanism and a second leg mechanism to control a first leg and a second leg of the robot to be perpendicular to ground upon determining a power outage condition;

instructions for transmitting second controlling signals to the first leg mechanism and/or the second leg mechanism to control the first leg and/or the second leg of the robot to move from the perpendicular to ground position, such that a first foot and/or a second foot of the robot are positioned at two sides of a ground projection point of center of gravity of the robot;

instructions for controlling the first leg and/or the second leg to move the center of gravity of the robot close to the ground;

instructions for transmitting third controlling signals to the first leg mechanism and/or the second leg mechanism to stop movements of the first leg mechanism and/or the second leg mechanism upon determining a stop condition.

8. The anti-falling device of robots during power outage as claimed in claim 7, wherein:

the robot is in the power outage condition in response to an amount of available supply power of the robot being lower than a predetermined value, or shutdown control signals have been received.

9. The anti-falling device of robots during power outage as claimed in claim 7, wherein the instructions for transmitting second controlling signals to the first leg mechanism and/or the second leg mechanism to control the first leg and/or the second leg of the robot such that a first foot and a second foot of the robot are positioned at two sides of a ground projection point of center of gravity of the robot further comprises:

instructions for adjusting the center of gravity of the robot to move the ground projection point of the center of the gravity to be positioned at the first leg of the robot;

instructions for controlling the second leg mechanism to drive the second leg of the robot to move along a first direction;

instructions for controlling the first leg mechanism and/or the second leg mechanism to drive the second foot of the robot to contact the ground;

instructions for adjusting the center of gravity of the robot to move the around projection point of the center of the gravity to be positioned at a middle of the first lea and the second leg of the robot.

10. The anti-falling device of robots during power outage as claimed in claim 9, wherein:

the second leg mechanism comprises a second hip joint connecting a waist and a second thigh of the robot, a second knee joint connecting the second thigh and a second calf of the robot, and a second ankle joint connecting the second calf and the second foot of the robot; wherein the second hip joint and the second knee joint are respectively mounted on two side of the second thigh, and the second ankle joint is mounted on the second calf;

wherein the instructions for controlling the second leg mechanism to drive the second leg of the robot to move along the first direction further comprises:

instructions for rotating the second hip joint and the second knee joint along a counterclockwise direction and rotating the second ankle joint along a clockwise direction.

11. The anti-falling device of robots during power outage as claimed in claim 7, wherein:

the first leg mechanism comprises a first hip joint connecting a waist and a first thigh of the robot, a first knee joint connecting the first thigh and a first calf of the robot, a first ankle joint connecting the first calf and the first foot of the robot; wherein the first hip joint and the first knee joint are respectively mounted on two side of the first thigh, and the first ankle joint is mounted on the first calf;

wherein the second leg mechanism comprises a second hip joint connecting a waist and a second thigh of the robot, a second knee joint connecting the second thigh and a second calf of the robot, a second ankle joint connecting the second calf and the second foot of the robot; wherein the second hip joint and the second knee joint are respectively mounted on two side of the second thigh, and the second ankle joint is mounted on the second calf;

wherein the instructions for controlling the first leg and/or the second leg to move the center of gravity of the robot close to the ground comprises:

instructions for rotating the first hip joint and the first knee joint along a counterclockwise direction;

instructions for rotating the first ankle joint along a clockwise direction;

instructions for rotating the second hip joint and the second knee joint along the counterclockwise direction; and instructions for rotating the second ankle joint along the clockwise direction.

12. The anti-falling device of robots during power outage as claimed in claim 7, wherein the instructions for transmitting second controlling signals to the first leg mechanism and/or the second leg mechanism to control the first leg and/or the second leg of the robot such that a first foot and a second foot of the robot are positioned at two sides of a ground projection point of center of gravity of the robot further comprises:

instructions for adjusting the center of gravity of the robot to move the ground projection point of the center of the gravity to be positioned at the first leg of the robot;

instructions for controlling the second leg mechanism to drive the second leg of the robot to move along a second direction;
instructions for controlling the first leg mechanism and/or the second leg mechanism to drive the second foot of the robot to contact the ground;
instructions for adjusting the center of gravity of the robot to move the ground projection point of the center of the gravity to be positioned at the second leg of the robot;
instructions for controlling the first leg mechanism to drive the first leg of the robot to move along a third direction; wherein the third direction is opposite to the second direction;
instructions for controlling the first leg mechanism and/or the second leg mechanism to drive the first foot of the robot to contact the ground.

13. An anti-falling device of robots during power outage, comprising:
one or more processors; and
a memory; and
one or more programs, wherein the one or more programs are stored in the memory and configured to be executed by the one or more processors, the one or more programs comprises:
instructions for transmitting first controlling signals to a first leg mechanism and a second leg mechanism to control a first leg and a second leg of the robot to be perpendicular to ground upon determining a power outage condition;
instructions for transmitting second controlling signals to the first leg mechanism and/or the second leg mechanism to control the first leg and/or the second leg of the robot such that a first foot and/or a second foot of the robot are positioned at two sides of a ground projection point of center of gravity of the robot;
instructions for controlling the first leg and/or the second leg to move the center of gravity of the robot close to the ground;
instructions for transmitting third controlling signals to the first leg mechanism and/or the second leg mechanism to stop movements of the first leg mechanism and/or the second leg mechanism upon determining a stop condition;
wherein the instructions for transmitting second controlling signals to the first leg mechanism and/or the second leg mechanism to control the first leg and/or the second leg of the robot such that a first foot and a second foot of the robot are positioned at two sides of a ground projection point of center of gravity of the robot further comprises:
instructions for adjusting the center of gravity of the robot to move the ground projection point of the center of the gravity to be positioned at the first leg of the robot;
instructions for controlling the second leg mechanism to drive the second leg of the robot to move along a first direction;
instructions for controlling the first leg mechanism and/or the second leg mechanism to drive the second foot of the robot to contact the ground;
instructions for adjusting the center of gravity of the robot to move the ground projection point of the center of the gravity to be positioned at a middle of the first leg and the second leg of the robot.

14. The anti-falling device of robots during power outage as claimed in claim 13, wherein:
the robot is in the power outage condition in response to an amount of available supply power of the robot being lower than a predetermined value, or shutdown control signals have been received.

15. The anti-falling device of robots during power outage as claimed in claim 13, wherein:
the second leg mechanism comprises a second hip joint connecting a waist and a second thigh of the robot, a second knee joint connecting the second thigh and a second calf of the robot, and a second ankle joint connecting the second calf and the second foot of the robot; wherein the second hip joint and the second knee joint are respectively mounted on two side of the second thigh, and the second ankle joint is mounted on the second calf;
wherein the instructions for controlling the second leg mechanism to drive the second leg of the robot to move along the first direction further comprises:
instructions for rotating the second hip joint and the second knee joint along a counterclockwise direction and rotating the second ankle joint along a clockwise direction.

16. The anti-falling device of robots during power outage as claimed in claim 13, wherein:
the first leg mechanism comprises a first hip joint connecting a waist and a first thigh of the robot, a first knee joint connecting the first thigh and a first calf of the robot, a first ankle joint connecting the first calf and the first foot of the robot; wherein the first hip joint and the first knee joint are respectively mounted on two side of the first thigh, and the first ankle joint is mounted on the first calf;
wherein the second leg mechanism comprises a second hip joint connecting a waist and a second thigh of the robot, a second knee joint connecting the second thigh and a second calf of the robot, a second ankle joint connecting the second calf and the second foot of the robot; wherein the second hip joint and the second knee joint are respectively mounted on two side of the second thigh, and the second ankle joint is mounted on the second calf;
wherein the instructions for controlling the first leg and/or the second leg to move the center of gravity of the robot close to the ground comprises:
instructions for rotating the first hip joint and the first knee joint along a counterclockwise direction;
instructions for rotating the first ankle joint along a clockwise direction;
instructions for rotating the second hip joint and the second knee joint along the counterclockwise direction; and
instructions for rotating the second ankle joint along the clockwise direction.

17. The anti-falling device of robots during power outage as claimed in claim 13, wherein the instructions for transmitting second controlling signals to the first leg mechanism and/or the second leg mechanism to control the first leg and/or the second leg of the robot such that a first foot and a second foot of the robot are positioned at two sides of a ground projection point of center of gravity of the robot further comprises:
instructions for adjusting the center of gravity of the robot to move the ground projection point of the center of the gravity to be positioned at the first leg of the robot;
instructions for controlling the second lea mechanism to drive the second leg of the robot to move along a second direction;

instructions for controlling the first leg mechanism and/or the second leg mechanism to drive the second foot of the robot to contact the ground;

instructions for adjusting the center of gravity of the robot to move the ground projection point of the center of the gravity to be positioned at the second leg of the robot;

instructions for controlling the first leg mechanism to drive the first leg of the robot to move along a third direction; wherein the third direction is opposite to the second direction;

instructions for controlling the first leg mechanism and/or the second leg mechanism to drive the first foot of the robot to contact the ground.

18. The anti-falling device of robots during power outage as claimed in claim 13, wherein instructions for transmitting third controlling signals to the first leg mechanism and/or the second leg mechanism to stop movements of the first leg mechanism and/or the second leg mechanism upon determining a stop condition further comprises:

instructions for transmitting third controlling signals to the first leg mechanism and/or the second leg mechanism to stop movements of the first leg mechanism and/or the second leg mechanism, in response to the center of gravity of the robot being lower than a predetermined height, or, the center of gravity of the robot falling by predetermined time period, or, any joint of the robot contacting the ground or a support table.

* * * * *